United States Patent [19]

Engels

[11] Patent Number: 4,948,373

[45] Date of Patent: Aug. 14, 1990

[54] STRUCTURAL MODEL OF THE HUMAN CRANIOMANDIBULAR SYSTEM

[76] Inventor: Paul A. Engels, Kopslaan 26, 2082 EJ Santpoort-Zuid, Netherlands

[21] Appl. No.: 351,064

[22] Filed: May 12, 1989

[51] Int. Cl.$^5$ ............................................. G09B 23/30
[52] U.S. Cl. ..................................... 434/270; 446/362
[58] Field of Search .................. 434/270, 262; 433/57; 446/365, 362, 331

[56] References Cited

U.S. PATENT DOCUMENTS

| 1,228,677 | 6/1917 | Gysi | 433/57 |
| 1,882,034 | 10/1932 | Raugstad | 446/362 |
| 2,771,708 | 11/1956 | Enison | 446/362 |
| 3,009,265 | 5/1960 | Bezark | 434/270 |

FOREIGN PATENT DOCUMENTS 2733501  2/1979  Fed. Rep. of Germany ...... 434/270

Primary Examiner—Richard J. Apley
Assistant Examiner—Rachel M. Healey
Attorney, Agent, or Firm—Edmund M. Jaskiewicz

[57] ABSTRACT

A structural model of the human craniomandibular system, comprises a cranium part, a flexible column formed by a plurality of vertebra parts interconnected by at least two elastic bands and by universal couplings, the top vertebra part rotatably supporting the cranium part. The cranium part is provided in opposite side faces thereof with cavities serving as bearing surfaces. A mandible part has top faces adapted to cooperate with said bearing surfaces and form a joint for movement of the mandible part, according to several degrees of freedom. Further, there are provided a hyoid part, a sternum part (41), a pair of clavicle parts coupled with said sternum part by universal couplings as well as a pair of scapula parts coupled with a respective clavicle part by universal couplings, the aforementioned parts being interconnected by a plurality of resilient members, arranged in pairs, which simulate the muscle functions.

9 Claims, 3 Drawing Sheets

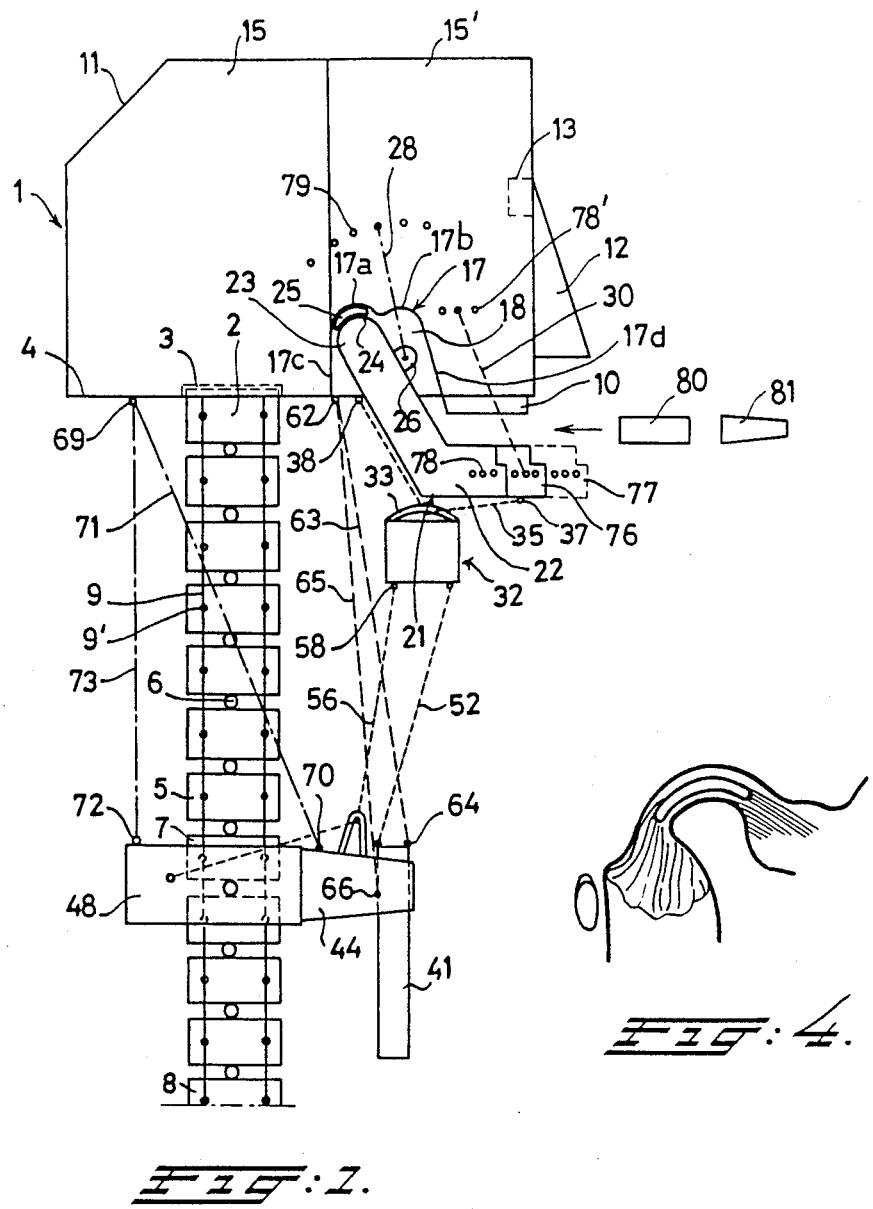

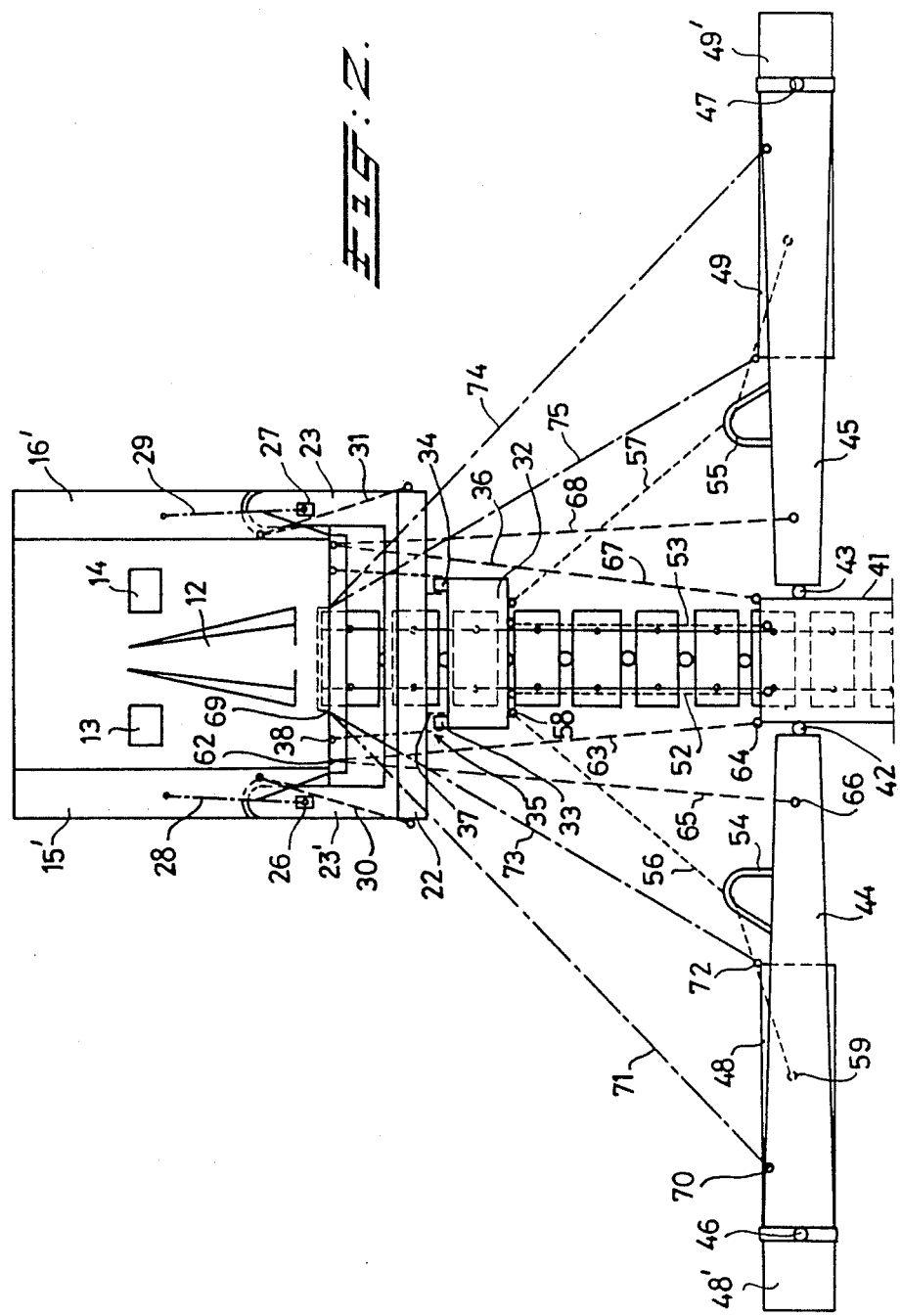

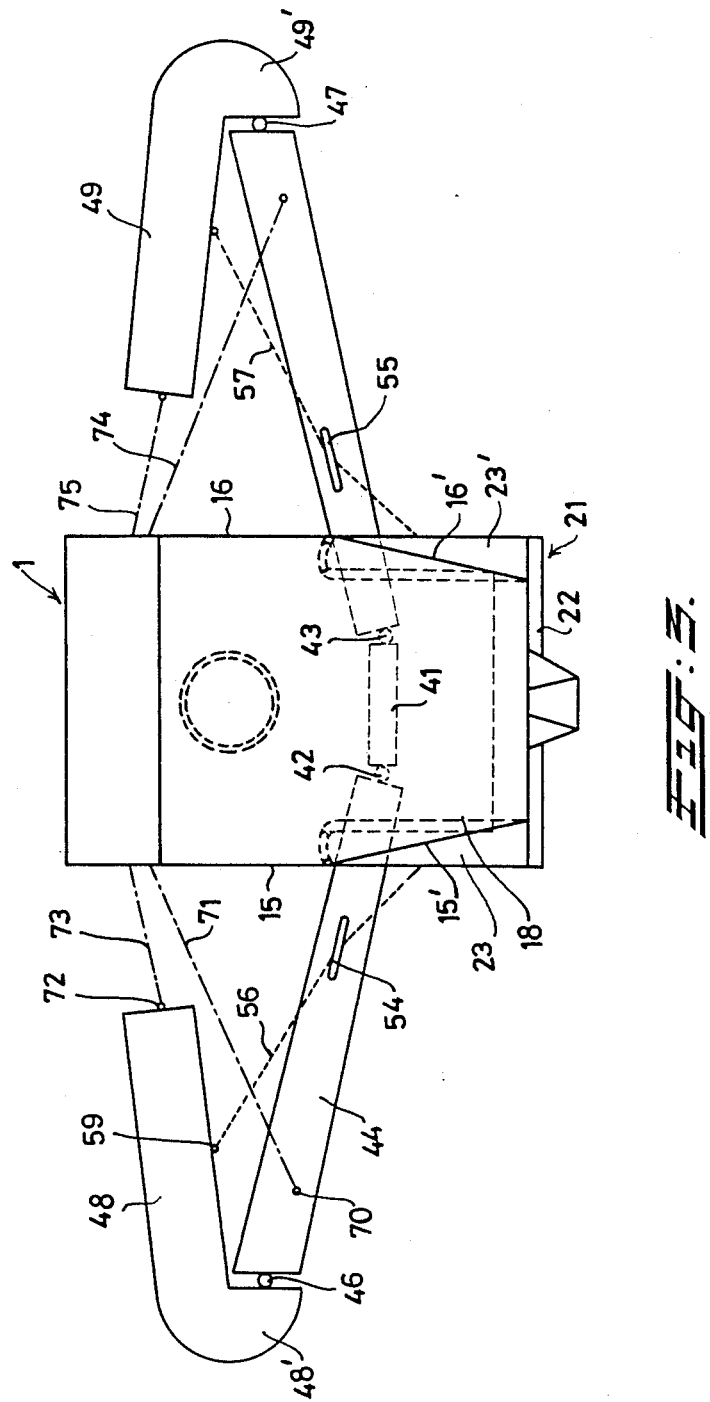

STRUCTURAL MODEL OF THE HUMAN CRANIOMANDIBULAR SYSTEM

BACKGROUND OF THE INVENTION

The invention relates to a structural model of the human craniomandibular system.

It has been customary to interpret the complicated connection between the skeletal and muscular components of the craniomandibular system with the help of a diagram which was first proposed by Brody in 1950. This diagram considered the skull or cranium, the tongue bone or hyoid bone, the vertebral column, the shoulder girdle and the associated musclegroups, the muscles of mastication, supra-and infrahyoid muscles and postcervical muscles, all in a side elevational view. The shoulder girdle and the vertebral column were taken to be the fixed base.

The Brody diagram has only been used to explain the connection between the skeletal and muscular components. Orthodontia has only occupied itself with the skeletal parts and the dentition. Anatomy, in practice, has limited itself to the study of the head and the cervical vertebrae upwardly to the atlas, which is the connection between the top of first cervical vertebra and the cranium which permits rotation. Anatomy has considered the further study of the head to belong to the field of dentistry. Dentistry, however, and particularly orthodontia, has only occupied itself with the skeletal parts and the dentition and gives hardly any attention to the functions and the functioning of the muscles.

At least four muscle functions affect the human dentition: posture maintenance of the head, facial expression, mastication, and deglutition. No function is completely independent of the others. In the diagram proposed by Brody it is essentially possible to keep the head in balance during these functions, since changing the head balance will affect all the functions.

According to physiology and anatomy, both sides of our body should be bilaterally symmetrical. Both sides function equally but oppositely, in order to balance the body. In practice, however, dissimilarities between the left and the right side of the body can be observed.

Such imbalances in a bilaterally symmetrical upright position are only possible if compensatory mechanisms are active. A tentative origin for this maintenance of equilibrium can be sought in the activation of muscles which were not originally designed for the function (Thompson and Brody). This maintenance of equilibrium cannot be explained with the Brody diagram, because this equilibrium requires that the shoulder girdle and the vertebral column are no longer considered as the fixed base.

A modification is thus required in order to permit an explanation of an unstable condition resulting from interaction of the various components of the craniomandibular system during bilaterally asymmetrical upright position of the human body. Such a modification would essentially permit the vertebral column to be flexible and twistable, and the scapula (omoplate) and clavicula (collar bones) to be movable with respect to the sternum (breastbone), and the cranium to be movable with respect to the vertebral column.

Consequently, the muscle systems in the area must be differentiated with respect to the vertebral column: the posterior head-equilibrium muscles are represented by the M. Trapezius and the anterior head-equilibrium muscles by the M. Sternocleidomastoideus; the mouth-closing muscles are one group and the mouth-opening muscles are differentiated to the suprahyoid M. Digastricus and the infrahyoid M. Sternohoyoideur and M. Omohyoideus.

This proposed modification gives an essential position to the hyoid bone and to the functions of the supra and infrahyoid muscles. The function and position of the hyoid bone can be influenced by all the structural elements with which it is connected and takes part in nearly all movements of the craniomandibular system such as mouth opening and closing, chewing, and swallowing. In fact, the hyoid bone functions as a second mandible, except for movements during swallowing.

When swallowing, the upper and lower jaw are in occlusion and the hyoid bone and related laryngeal and pharyngeal structures move downwardly. This means, that if the mandible finds itself in a rotated position, the hyoid bone is also rotated and the function of the related structures will be disturbed. In fact, one of the characteristics of the supra- and infrahyoid muscles is supposed to be, that they are not capable of proper functioning when they are stretched or must deal with greater tensions then for which they were originally destined. These muscles and their disposition of nerves induce other muscular structures to take over or to facilitate part of their function, a supposition that is supported by electrographic findings (Davies) pointing out the simultaneous activities of infra-hyoid and posterior cervical muscle system.

OBJECT OF THE INVENTION

Based on the premise that the above described characteristics of the supra- and infrahyoid muscle systems are correct, the present invention not only discloses a theoretical diagram or scheme, but also provides a structural model of the craniomandibular system, which can be manufactured as an industrial product, and which can be used to facilitate the understanding the effect of the mandible on the other structural elements of the craniomandibular system, including its relationship to the position of the cervical spine, particularly when considered in a transverse plane.

The object of the present invention is to provide a structural model which will facilitate understanding the relationship between the rotation of the passive rotation axis—defined as an axis resulting from two centers of rotation, namely, of each of the temporomandibular joints—the subsequent compression of the passive rotation axis and distraction in the temporomandibular joints, and body-posture, especially concerning the head equilibrium. This structural model would also enable the determination of the influence of the rotation of the mandible—as a three dimensional phenomenon, on all structural elements of the craniomandibular system.

SUMMARY OF THE INVENTION

According to the present invention, a structural model of the human craniomandibular system essentially comprises:

a cranium part, a flexible column formed by a plurality of vertebra parts comprising seven cervical vertebra parts, the vertebra parts being interconnected by at least two elastic bands each attached to at least one point on each of the vertebra parts, and by universal couplings, the first or top cervical vertebra part supporting the cranium part in such a manner as to allow a rotational movement only, the cranium part being provided in opposite side faces with cavities open to the bottom and open to the side, and serving as bearing surfaces, there being provided a mandible part having top or end faces adapted to cooperate with said bearing surfaces so as to form a joint for movement of the mandible part relative to the cranium part, according to several degrees of freedom, there being further provided a hyoid part having a bow at the top, a sternum part, a pair of clavicle parts on either side of said sternum part, resp. and coupled therewith by means of universal couplings, a pair of scapula parts coupled with a respective clavicle part by means of universal couplings, the aforementioned parts are interconnected by a plurality of resilient members, arranged in pairs, between attachment points at the upper portions of the mandible element and the side faces of the cranium part between the lower portions of the mandible part and the side faces of the cranium part, between attachment points on the lower portion of the mandible part, extending through a bow provided on the hyoid part, and attachment points on the bottom face of the cranium part, between the hyoid part and the sternum part, between attachment points on the lower face of the cranium part, extending through bows provided on the clavicle parts and attachment points on the scapula parts, between attachment points on the lower face of the cranium part and the sternum part and attachment point at the sternum part, between the lastmentioned attachment points on the cranium part and attachment points on the clavicle parts, between attachment points on the cranium part and attachment points on the scapula parts and between lastmentioned attachments points on the cranium part and attachment points on the scapula parts.

CONCISE DESCRIPTION OF THE DRAWINGS

A specific embodiment of the invention will now be described in detail with reference to the accompanying drawings, which are for exemplary purposes, wherein:

FIG. 1 is a schematic representation of a specific embodiment of this invention in a side elevational view;

FIG. 2 is a front elevational view of FIG. 1;

FIG. 3 is a top plan of FIG. 1;

FIG. 4 depicts the structure of the temporomandibular joint in the human head.

DETAILED DESCRIPTION OF THE PREFERRED EMBODIMENT

As may be seen in FIG. 1, the skull part or cranium part 1 is supported by part 2 which represents the first cervical vertebra (in anatomy called $C_1$). Vertebra part 2 is inserted into a shallow cavity 3 in a lower face 4 of the cranium part, such that the only movement of parts 1 and 2 relative to each other is a rotation.

The first cervical vertebra part 2 is in turn supported by a series of 6 further cervical vertebra parts, (and representing cervical vertebrae ($C_2$–$C_7$), the lowermost one of which is indicated by 5, all interconnected by means of universal joints, one of these being indicated at 6.

Similarly, further downward, there are five additional vertebra parts, the uppermost one of which is indicated by 7 and the lowermost one by 8 (representing the thoracical vertebrae Th 105) They are all coupled by means of universal couplings similar to the joint indicated at 6, with only one exception: the seventh cervical vertebra part 5 is limited by abutments, not shown, in its movement to the first thoracical vertebra part 7 as compared to the other cervical vertebrae parts.

The vertebra elements 2, 5, 7, 8 are also interconnected by a number of elastic vertical bands. In the present embodiment there are four of them, one of which is indicated by 9, and which have at least one point of attachment 9' with each individual vertebra. As a result, none of the individual components of the vertebral column is able to perform an independent rotation or translation. However, any overall rotation of the cranium part will be equally divided over elementary rotations of the individual vertebra parts by means of the various universal coupling joints 6. In similar manner, the thoracical vertebra parts perform a coordinated rotation.

The cranium part 1 has essentially a parallel-piped or block shape. An inclined surface 11 thereon is optional, as are a projecting part 12 and two cavities 13 and 14 on both sides of projecting part 12 which merely serve to create a resemblance with a human head, but which have no relationship to the functioning of the model. Elements 12, 13 and 14 indicate the anterior or front of the cranium 1 or skull and, in fact, of the entire structural model.

An upper jaw 10 projects slightly downwardly with respect to the lower face 4 of the cranium part 1.

Parallel side faces 15, 16 of the cranium part 1 pass into side face portions 15', 16', respectively, which are somewhat tapering towards the front, as can be seen by comparison of FIG. 1 and FIG. 3.

In side face portions 15' and 16' there are cavities 17, one of which is visible in FIG. 2, indicated by a contour, this cavity 17 being open to the side and to the bottom. The rear walls of these cavities, such as rear wall 18 of cavity 17, extend again parallel to the side face portions 15, 16, as seen in the top view of FIG. 3 where 18 is shown as a broken line.

In FIG. 1, cavity 17 comprises, in its top part, two sub-cavities 17a, 17b, the former of which passes into a vertical side wall 17c, and the latter into a downwardly forwardly inclined front wall 17d. These details are visible only for what may be termed the right hand side of the cranium part or the model, visible in FIG. 1, but it will be clear that in these and all other aspects the structure of the cavity at the left hand side is entirely symmetrical. A jaw part or mandible part, indicated at 21, is separate from the cranium part 1. In the lateral view of FIG. 1, its shape is defined by a lower portion 22, which, when properly mounted, will extend substantially horizontal, i.e. parallel to the lower face 4 of the mandible part 1, and a top portion 23 extending under an obtuse angle with respect to portion 22.

In the front elevational view of FIG. 2, the mandible part 21 is substantially U-shaped, lower portion 22 extending horizontally and interconnecting two top portions now indicated as 23 and 23', respectively, which are the legs of the U-shape.

The tops of each of the upper portions 23 and 23' of the mandible part are rounded, as indicated by 24, in two dimensions, that is substantially part-spherical. This shape intended in order to keep the mandible top 24 in place in sub-cavity 17a, which is also part-spherical so as to be curved in two dimensions. A removable disc 25, the shape of which is adapted to the curvatures of cavity 17a and mandible part top surface 24 is interposed therebetween. For a proper understanding of this structural simulation of the temporomandibular joints in the human craniomandibular system reference may be had to FIG. 4.

The joints between mandible part 21 and cranium part 1—which joints are formed by the cavities 17, the rounded tops 24 of the mandible part and the interposed discs 25—present the same degrees of freedom as the human temporomandibular joints.

FIG. 3 illustrates clearly that the dimensions also provide for a lateral movement of the mandible part 21 with respect to the cranium part because of the spacing between the upper portion 23 of the mandible part and the rear wall 18 of cavity 17, and the similar spacing at the other side.

Upper portions 23 of mandible part 21 are provided with preferably integrally formed attachments 26, 27 for resilient elements 28, 29 (in order to distinguish them from others they are drawn in mixed lines). The other ends of resilient elements 28 and 29 are affixed to the cranium part 1 in the side face portions 15', 16' thereof, in a manner yet to be described. The resilient elements 28, 29, simulate the temporal muscles.

Similarly, resilient elements 30, 31 (drawn in broken lines of longer parts) interconnect at a more forward location lower portion 22 of mandible 21 and cranium part 1 in the inclined side face parts 15', 16'. They simulate the masseter muscles. Temporal muscles 28, 29 and masseter muscles 30, 31 together form the mouth closing muscles.

The hyoid bone or tonguebone is a free floating bone which is kept in place by muscular equilibrium. It is simulated by hyoid part 32 which, at its top, is provided with bows 33, 34. Through each of these bows a further resilient element 35, 36 extends (drawn in broken lines of shorter elements). One end of element 35 is attached to lower portion 22 of mandible part 21, at 37, and the other end is attached at 38 to the lower face of the cranium part, slightly inside side face portion 15'. Resilient elements 35, 36 simulate the suprahyoid muscles.

In the downward direction, the hyoid part 32 is kept in place by resilient elements attached to further bone simulating parts which will first be described. Numeral 41 indicates the breastbone part or sternum part, (shown completely in FIG. 1, and only partly in FIG. 2) which, through universal joints 42, 43 on either side, is coupled to collar bone parts or clavicle parts 44, 45 respectively, the elongate shape and the position of which are best visible from FIGS. 2 and 3. At their other ends, clavicle parts 44, 45 have universal joint couplings 46, 47 to omoplate parts or scapula parts 48, 49, respectively. In short, each of these scapula parts comprises an elongate portion which, at one of its ends, is provided with a laterally extending portion 48', 49', against the inside of which the universal joint 46, 47 is located.

Joints 46, 47 between scapula and clavicle parts thus permit a limited hingelike or pivoting movement both in posterior/anterior directions and in cranio/caudal directions. The same limited pivoting is also present in the joints 42, 43 between sternum and clavicle parts, although here the cranio/caudal movement is nearly 45 degrees in cranial direction.

Resilient elements 52, 53 (broken lines of shorter elements) are connected between the lower side of hyoid part 32 and the top, at the rear side, of sternum part 41. The elements 52 and 53 simulate the sternohyoid muscles.

At the tops of clavicle parts 44, 45, there are bows 54, 55 through which resilient elements 56, 57 (broken lines of shorter elements) respectively extend, with one end thereof affixed to the hyoid part 32 at locations one of each is indicated by 58, the other ends being affixed to scapula parts 48, 49 at locations one of which is indicated by 59. They represent the omohyoid muscles. One point 62 of the lower face of the cranium part 1 close to the place where the inclined side face portion 15' merges into the remainder of the side face 15, is connected by means of a resilient element 63 (broken line of longer elements) to a point 64 at the top, near the front, of sternum part 41, and also by a resilient element 65 (broken lines of longer elements) to a point 66 on clavicle part 44. Similarly, there are resilient elements 67, 68 at the left hand side. Elements 63, 65, 67, 68 represent the ventral or anterior head equilibrium muscles.

Finally, a point 69, also on the lower face 4 of cranium part 1 but more inwardly with respect to the side face 15 thereof, is connected to a point 70 of clavicle part 44 by resilient element 71 (mixed line), as well as to point 72 at the end of scapula part 46 by resilient element 73 (mixed line). Similarly, at the left side, there are resilient elements 74 and 75. Resilient elements 71, 73, 74, 75 represent the dorsal or posterior head equilibrium muscles.

Preferably all resilient elements comprise elastic bands.

The figures of the drawings represent a few preferred features. The lower portion 22 of mandible part 21 has been represented in straight lines with a click on-click off enlargement piece 76, which will give the mandible part such dimensions as to represent a so-called Angle Class I situation of mandible part 21 relative to cranium part 1. By removing piece 76 the horizontal dimension of lower portion 22 of mandible part 21 will be decreased so that an Angle Class II situation is simulated, and the addition of the further enlargement piece drawn in broken lines 77 introduces the Angle Class III situation.

Both the basic part and the enlargement pieces 76 and 77 each present at least three attachment places on either side for the elastic bands 30, 31. One of these attachment places is 78, and they may comprise simple holes so that the elastic band is attached to it by means of a pin, not shown, which is inserted into the appropriate hole. Similarly, three attachment points on either side such as 78' are provided along a horizontal line in side face portions 15' of cranium part 1, so that the best choice for attachment of the upper ends of elastic bands 30 and 31 can be made to represent the patient in question.

A further facility to adjust the model to conform with the patient under examination are a series of attachment points, also preferably comprising holes, one of which is indicated in FIG. 1 by 79. The holes in one series—in the embodiment represented there are six holes—are situated on an arc of an imaginary circle having as its center the attachment 26 of mandible part 21 in its normal position. By choosing any of these holes, the momentum angle of the temporal muscle simulating elastic band 28 can be chosen. It will be clear that again these arrangements are similarly provided at the other side of the cranium part which is not visible in FIG. 1.

Indicated schematically in FIG. 1 are two inserts 80 and 81. They represent the dental arches. Either one of them will be inserted between the jaw bones of cranium and mandible part. Insert 80 is a substantially parallelepiped member. When insert 80 is inserted, the mandible part 21 will assume a normal position with respect to the cranium, i.e. a position in which the lower mandible portion 22 is horizontal or parallel to the upper jaw or maxillary bone part 10.

Insert element 81 has diverging upper and lower faces, and can be used to simulate the situation in those patients where the lower mandible portion 22 is either upwardly or downwardly inclined with respect to the upper jaw 10.

The manner in which the above described structural model can be utilized will now be described by reference to a combination of both the physical parts in the craniomandibular system and the equivalents or simulated counterparts thereof in the structural model.

Most striking in the craniomandibular system is the pulley-like function of the two biventral muscles with a tendon partition, the digastric and the omohyoid muscle; which act in opposition directly upon the hyoid bone 32. The opening of the mouth is characterized by a downward and forward direction, according to the skeletally prescribed path at a fixed hyoid bone 32. If this pathway is unilaterally obstructed a series of systems comes into action.

Assuming an obstruction on the right side of the head, there is an increase of tension in the suprahyoid muscles (represented by elastic band 35. In order to overcome the obstruction, while on the other side the movement continues, will lead to rotation of the mandible 21, but also of the hyoid bone part 32, while the direction of the force is headed cranially. In order to compensate for the increased tension in the suprahyoid muscle there will be a reaction in the sternohyoid and the omohyoid muscles (elements 52 and 56) on the same side, because their function is to fix the hyoid bone, so the scapula and the clavicle block becomes involved.

According to the model which may now be called Obstruction Model, the increased tensions on the obstructed side can be compensated for by a decrease of distances towards the hyoid bone on the same side by bending the cranium forwardly and downwardly and the scapula-clavicle block forwardly and upwardly. The cervical spine will bend in the direction of the resulting vector of these movements.

A result of this compensation will be an increase in tension in the posterior head equilibrium muscles (71, 73) and a decrease of tension in the anterior head equilibrium muscles (63, 65) on the side of the obstruction, and on the other side, there will be an increase in tension of both the posterior and the anterior head equilibrium muscles.

These muscular activities can only lead to the situation in which the cranium is pulled backward and more horizontally, because of the increased tensions in both posterior head equilibrium muscle systems. This position of the skull is called anteroposition.

More increased tension on the contralateral side in both posterior and anterior head equilibrium muscles can be compensated once more by changing the position of the scapula-clavicle block on this contralateral side.

The Obstruction Model shows that an unilateral obstructed mouth opening leads to rotation of both the mandible and the hyoid bone. This rotation will lead to increased stretching forces on sternum and clavicle by reflectory working muscles. These forces can be compensated by bringing the head and the shoulder together, an action which requires adaptation of the spine. The muscle groups dealing with raising of the shoulder or bending of the head are for a great part the same as those concerned with extending the head.

At the same time as the described lateroflexion and extension of the head and neck and elevation and protraction of the shoulder occur, the contra-lateral posterior head equilibrium musculature reacts and pulls the head back into anteroposition through rotation on high cervical spine level. The flexory answer on the extension and further reactions influence the position of the shoulders.

According to the Obstruction Model, a whole chain of reactions comes into action when the head equilibrium is disturbed, a chain which will not stop at the shoulder girdle, but which will influence the whole body equilibrium.

In the perspective of the Obstruction Model, a symmetrical occlusion and the possibility of free mandibular movements are a prerogative for the whole craniomandibular system. The results of such an investigation of relating the passive rotation axis, the rotation of the mandible and its condyles to the head and body equilibrium to each other demonstrate the complexity of the craniomandibular system.

The explanation of the Obstruction Model clearly shows, that the more complicated the cause of dysfunction is, the more compensatory reactions can be expected. Taken into consideration that genetic factors, bad habits and premature loss of teeth are the most important factors which influence the occlusion and the intermaxillary relationship and consequently the position of the condyles and the hyoid bone and its related structures, the role of dentistry and especially orthodontics becomes ever-increasingly important in general medical care and welfare The structural model of this invention is useful in obtaining an understanding and in determining an effective answer to the problems.

What is claimed is:

1. A structural model of the human craniomandibular system, comprising:
    a cranium part (1),
    a flexible column formed by a plurality of vertebra parts comprising seven cervical vertebra parts (2-5), the vertebra parts being interconnected by at least two elastic bands (9) each attached in at least one point (9') to each of the vertebra parts, and by universal couplings (5), the first or top cervical vertebra part (2) supporting the cranium part (1) in such a manner as to allow for a rotational movement only,
    the cranium part (1) being provided in opposite side faces (15, 15') with cavities (17) open to the bottom and open to the side, and serving as bearing surfaces,
    there being provided a mandible part (21) having top or end faces (24) adapted to cooperate with said bearing surfaces and form a joint for movement of the mandible part (21) relative to the cranium part (1), according to several degrees of freedom, there being further provided a hyoid part (32) having a bow (33) at the top, and
a sternum part (41),
a pair of clavicle parts (44, 45) on either side of said sternum and coupled therewith by means of universal couplings (42, 43) as well as
a pair of scapula parts (48, 49) coupled with a respective clavicle part by means of universal couplings (46, 47),
the aforementioned parts being interconnected by a plurality of resilient members, arranged pairwise, to wit
(28, 29) between fixation points (26) at the upper portions (23) of the mandible element (21) and the side faces (15') of the cranium part (1),
(30, 31) between the lower portions (22) of the mandible part and the side faces (15') of the cranium part (1),
(35, 36) between attachment points (e.g. 37) on the lower portion (22) of the mandible part (21), extending through a bow (33) provided on the hyoid part (32), and attachment points (e.g. 38) on the bottom face of the cranium part (1),
(52, 53) between the hyoid part (32) and the sternum part (41),
(56) between attachment points (58) on the lower face of the cranium part (32), extending through bows (e.g. 54) provided on the clavicle parts (44, 45) and attachment points (e.g. 59) on the scapula parts (48, 49),
(63, 67) between attachment points (e.g. 62) on the lower face of the cranium part (1) and the sternum part (41) and attachment points (e.g. 64) at the sternum part (41),
(65, 68) between the last mentioned attachment point (e.g. 62) on the cranium part and attachment points (e.g. 66) on the clavicle parts (44, 45),
(71, 74) between attachment points (e.g. 69) on the cranium part (1) and attachment points (70) on the scapula parts (44, 45) and
(73, 75) between last mentioned attachments points (e.g. 69) on the cranium part and attachment points (e.g. 72) on the scapula parts (48, 49).

2. A model as in claim 1, wherein
said cavity (7) has two subcavities (17a, 17b), at least one (17a) of which is curved in two dimensions, and wherein
said top or end faces (24) of the mandible part (21) are also curved in two dimensions,
there being provided a removable disk (25) between each cooperating pair of subcavity (17a) and top or end face (24).

3. A model as in claim 1, wherein
said mandible part (21) comprises a lower part (22) and two upper parts (23) which are integrally formed but, viewed laterally, make an obtuse angle, the lower portion (22) at the same time forming the cross member and the upper portions (23) the legs of a U-shape, viewed in elevation.

4. A model as in claim 1, wherein
said mandible part (21) comprises a lower part (22) and two upper parts (23) which are integrally formed but, viewed laterally, make an obtuse angle, the lower portion (22) at the same time forming the cross member and the upper portions (23) the legs of a U-shape, viewed in elevation, and
said lower portion (22) of the mandible part is provided with click on-click off enlargement pieces (76, 77).

5. A model as in claim 1, wherein for said resilient elements (28, 29) interconnecting the upper portion (23) of the mandible part (21) and the side faces (15') of the cranium part (1), the cranium part has a plurality of attachment points (79), one of which may be chosen as desired.

6. A model as in claim 1, wherein for said resilient elements (30, 31) interconnecting the lower portion (22) of the mandible part (21) and the side faces (15') of the cranium part (1), the cranium part (1) has a plurality of attachment points (78') and the lower portion (22) of the mandible part has a plurality of attachment points (78)

7. A model as in claim 1, wherein
said mandible part (21) comprises a lower part (22) and two upper parts (23) which are integrally formed but, viewed laterally, make an obtuse angle, the lower portion (22) at the same time forming the cross member and the upper portions (23) the legs of a U-shape, viewed in elevation,
said lower portion (22) of the mandible part is provided with click on-click off, enlargement pieces (76, 77) and wherein
for said resilient elements (30, 31) interconnecting the lower portion (22) of the mandible part (21) and the side faces (15') of the cranium part (1), the cranium part (1) has a plurality of attachment points (78') and the lower portion (22) of the mandible part and said enlargement pieces have a plurality of attachment points (78).

8. A model as in claim 1, wherein
said resilient members comprise elastic bands.

9. A model as in claim 1, wherein
several pieces (80, 81) are provided, having different shapes, and adapted to be inserted between the lower portion (22) of the mandible part and an upper jaw portion (10) of the cranium part (1).

* * * * *